United States Patent [19]

Umetsu

[11] Patent Number: 5,027,637
[45] Date of Patent: Jul. 2, 1991

[54] DIE CUSHION FOR APPLYING PRESSURE TO A PRESS MACHINE VIA GAS PRESSURIZED PUSH RODS

[75] Inventor: Chiharu Umetsu, Yokohama, Japan
[73] Assignee: NHK Spring Co., Ltd., Yokohama, Japan
[21] Appl. No.: 452,126
[22] Filed: Dec. 15, 1989

[30] Foreign Application Priority Data

| Dec. 26, 1988 [JP] | Japan | 63-326177 |
| Jan. 13, 1989 [JP] | Japan | 1-7440 |
| Jan. 23, 1989 [JP] | Japan | 1-13352 |

[51] Int. Cl.⁵ .................... B21D 24/02; F16F 9/04
[52] U.S. Cl. .................... 72/453.13; 267/119; 267/122
[58] Field of Search ........... 267/119, 122, 130, 64.23; 72/453.13

[56] References Cited

U.S. PATENT DOCUMENTS

| 3,140,085 | 7/1964 | Bourcier de Carbon | 267/64.23 |
| 3,295,846 | 1/1967 | Robertson | 267/122 |
| 3,380,729 | 4/1968 | Hoffmann et al. | 267/64.23 |
| 3,633,899 | 1/1972 | Blout | 267/122 |
| 4,813,519 | 3/1989 | Matsubara et al. | 188/299 |
| 4,828,231 | 5/1989 | Fukumura et al. | 267/64.23 |
| 4,838,527 | 6/1989 | Holley | 267/119 |
| 4,844,429 | 7/1989 | Ecktman | 267/119 |
| 4,921,224 | 5/1990 | Fukumura et al. | 267/122 |

FOREIGN PATENT DOCUMENTS

| 55-133825 | 10/1980 | Japan . |
| 60-9526 | 1/1985 | Japan . |
| 62-82126 | 5/1987 | Japan . |
| 996768 | 2/1983 | U.S.S.R. . |

Primary Examiner—David Jones
Attorney, Agent, or Firm—Frishauf, Holtz, Goodman & Woodward

[57] ABSTRACT

A die cushion device includes a cylinder having a closed one end and the other end with a through-hole. A push rod is inserted into the cylinder through the through-hole and is freely movable in the axial direction of the cylinder. The interior of the cylinder is partitioned by a bellows into a liquid chamber communicating with the through-hole and housing a part of the push rod, and a gas chamber located on the closed end side of the cylinder. Operation liquid is filled in the liquid chamber. Gas is sealed in the gas chamber and pressurizes, through the bellows and the liquid, the push rod in a direction of projecting from the cylinder.

23 Claims, 5 Drawing Sheets

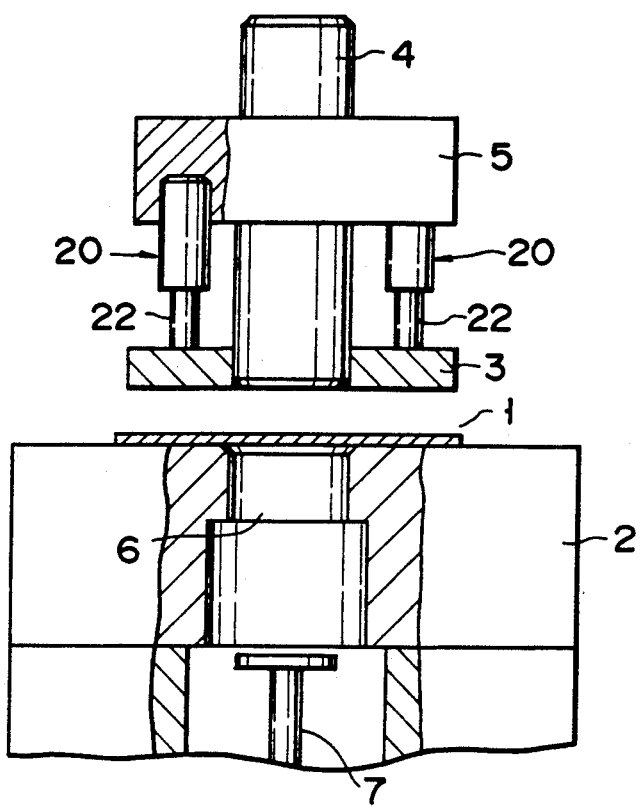
F I G. 1
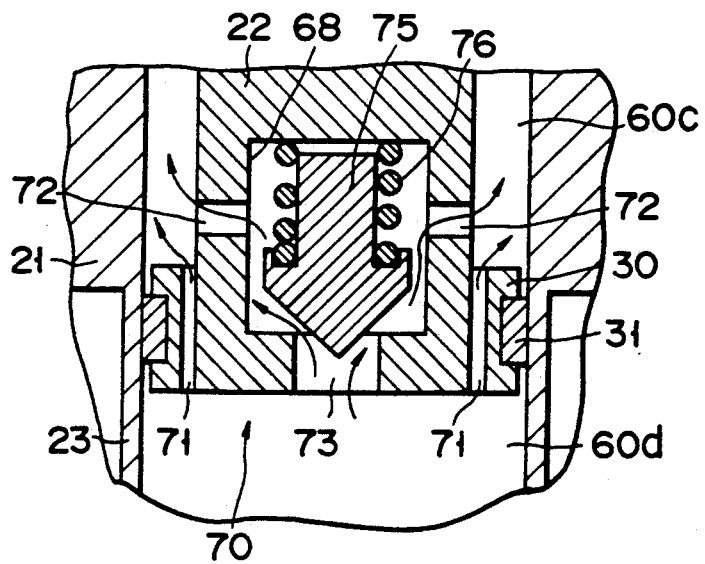
F I G. 3

DIE CUSHION FOR APPLYING PRESSURE TO A PRESS MACHINE VIA GAS PRESSURIZED PUSH RODS

BACKGROUND OF THE INVENTION

1. Field of the Invention

The present invention relates to a die cushion device of a gas-filled type for use with press machines and the like.

2. Description of the Related Art

There have been provided various kinds of press machines for drawing blanks. Generally, the press machines of this type have a die and a punch to press the blank. During drawing, the working portion of a blank is drawn into the die hole by the punch, so that the peripheral portion of the blank is applied with compression strain in the circumferential direction of the blank, thus being wrinkled. For this reason, the press machines have a pressure pad for preventing wrinkles, and press a blank while holding the peripheral portion of the blank between the die and the pressure pad. When wrinkle-preventing force or load applied to the pressure pad is too weak, wrinkles are caused on the drawn piece. When load is too strong, the blank is broken by the punch while being processed. Therefore, in order to obtain a completely-drawn piece, a proper wrinkle-preventing force should be applied to the blank.

Common press machines have die cushion devices so as to generate the above-mentioned wrinkle-preventing force. There has been well known a die cushion device which generates the wrinkle-preventing force by using the spring pressure of a coil spring and the like. In the case wherein the die cushion device of this type is employed with a press machine which has a long press stroke and is used for a deep drawing, however, a spring large in dimension is needed, which makes the whole size of the device large. Further, the spring constant of the device becomes large accordingly, which naturally changes the wrinkle-preventing force to a great extent during pressing the blank, thereby making large the possibility of breaking the blank.

In order to eliminate these drawbacks of the die cushion device of the spring pressure type, there has been provided die cushion devices which utilize gas pressure. This die cushion device includes a cylinder in which gas higher than several tens barometric pressures is sealed, a piston movably inserted in the piston, and a rod extended from the piston, passing through a part of the cylinder, and connected to a pressure pad. Gas pressure in the cylinder acts on the piston to force the rod out of the cylinder. A seal is provided the slide contact portion between the rod and the cylinder or between the piston and the cylinder.

With the die cushion device of the gas pressure type, the wrinkle-preventing force can be set such a value that corresponds to the pressure of gas sealed in the cylinder at the start of pressing a blank, and the spring constant of the device can be set low by making the volume of the cylinder large. As compared with the devices using a coil spring and the like, therefore, change in the wrinkle-preventing force can be held smaller in the course of pressing a blank.

However, high pressure gas in the cylinder is sealed directly by the seal provided at the slide contact portion, so that it cannot be therefore avoided that gas leaks little by little through the seal. This causes the wrinkle-preventing force (or set load) to be reduced for a relatively short time period, thereby making it impossible to hold the predetermined wrinkle-preventing force stable. In a case wherein plural die cushions are used to push a pressure pad, the gas leakage from each of the die cushions is not uniform and this makes it impossible to apply uniform surface pressure to the pressure pad.

SUMMARY OF THE INVENTION

The present invention is therefore intended to eliminate the above-mentioned drawbacks and its object is to provide a die cushion device capable of stably generating a predetermined set load.

In order to achieve the above object, according to the present invention, a die cushion device comprises a cylinder having a closed one end and the other end with a through-hole; a push rod inserted into the cylinder through the through-hole and freely movable in the axial direction of the cylinder; a bellows having a metal-made bellows body housed in the cylinder and extensible in the axial direction of the cylinder, said bellows partitioning the interior of the cylinder into a liquid chamber communicated with the through-hole and housing the push rod therein and a gas chamber located on the closed end side of the cylinder; means for sealing a space between the push rod and the through-hole; operation liquid filled in the liquid chamber; and gas sealed in the gas chamber and forcing, through the bellows and the operation liquid, the push rod in a direction wherein said push rod projects from the cylinder.

According to a die cushion device having the above-described arrangement, the pressure of gas sealed in the gas chamber of the cylinder acts on the operation liquid in the liquid chamber through the metal bellows, so that the push rod is applied with load in a direction in which the push rod is pushed out of the cylinder. This load serves as the wrinkle-preventing force in the course of pressing the blank. During pressing a blank, when the push rod moves to come into the cylinder, the gas in the gas chamber is compressed in accordance with the amount of the movement of the rod, thereby deforming the bellows in a direction along the axis the cylinder. Thus, the repulsive force of gas in the gas chamber is made higher. When the rod moves to come out of the cylinder at the step of opening the die, the volume of the gas chamber gradually increases, thereby deforming the bellows in a reverse direction.

The pressure of gas in the gas chamber also acts on the liquid chamber. Therefore, the pressure of gas acts on the slide contact portion between the through-hole of the cylinder and the rod through the operation liquid in the liquid chamber. However, since the sealing means provided at the slide contact portion serves only to seal the operation liquid in the liquid chamber, the cylinder can be more surely sealed by the sealing means as compared with the case wherein high pressure gas is directly sealed by the sealing means. The gas and liquid chambers are partitioned by the metal bellows, so that the high pressure gas in the gas chamber cannot leak into the liquid in the liquid chamber through the bellows.

BRIEF DESCRIPTION OF THE DRAWINGS

FIG. 1 is a partly cut-away front view of a press machine provided with a die cushion device according to an embodiment of the present invention;

FIG. 3 is an enlarged sectional view showing a part of the die cushion;

DETAILED DESCRIPTION OF THE PREFERRED EMBODIMENTS

Figure 2:
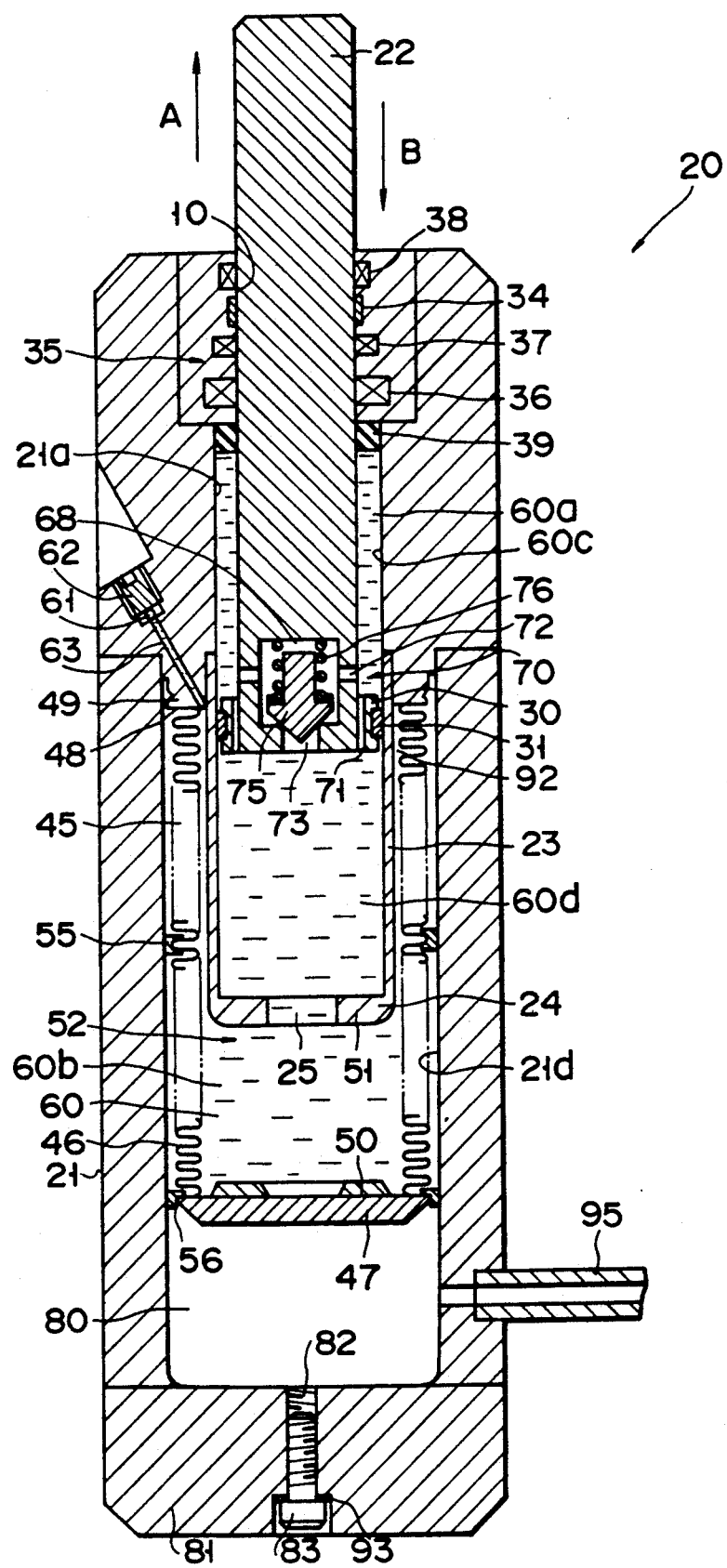
FIG. 2 is a sectional view of a die cushion.

Embodiments of the present invention will now be described in detail with reference to the accompanying drawings.

FIG. 1 shows a press machine provided with a die cushion device according to an embodiment of the present invention. The press machine has die 2 provided with a hole 6, and punch 4 located above die 2. Punch 4 is fixed to slider 5 and moved up and down together with it by a drive mechanism (not shown). A die cushion device having plural, e.g., two die cushions 20 is attached to slider 5. Ring-shaped pressure pad 3 is arranged around punch 4 and a push rod of each of die cushions 20 which will be described later is connected to the pressure pad.

During pressing operation, pressure pad 3 which serves as wrinkle-preventing means moves downward together with slider 3, contacts the peripheral portion of blank 1 mounted on die 2, and pushes the blank against die 2 with a predetermined force applied from die cushion 20. At the same time, punch 4 draws the blank into hole 6 of die 2. When the lowering of punch 4 is finished, slider 5 is lifted and a drawn or pressed piece is forced out of hole 6 by knockout member 7.

The die cushion device will be described in detail. Two die cushions 20 are same in arrangement and description will be therefore made on one of them.

As shown in FIG. 2, die cushion 20 has hollow cylinder 21 and push rod 22. Upper and lower ends of cylinder 21 are closed by end walls. The upper end wall of cylinder 21 is provided with through-hole 10 extending coaxial with cylinder 21. Push rod 22 is inserted into cylinder 21, slidably passing through through-hole 10. The inner face of cylinder 21 is stepped to form smaller- and larger-diameter portions 21a and 21b and shoulder 49 located between these portions 21a and 21b. Inner sleeve 23 having an inner diameter same as that of smaller-diameter portion 21a is housed in larger-diameter portion 21b of cylinder 21. The upper end of inner sleeve 23 is fixed to shoulder 49, thereby allowing inner sleeve 23 to extend coaxial with smaller-diameter portion 21a of cylinder 21. Bottom wall 24 of inner sleeve 23 is provided with port 25.

Rod 22 is inserted into cylinder 21 and freely slidable in the axial direction of cylinder 21. Piston 30 is formed at the inner end, i.e., the lower end of rod 22. This piston 30 slides on inner faces of smaller-diameter portion 21a and inner sleeve 23 through slide bearing 31 fixed to the outer circumference of the position.

Through-hole 10 through which rod 22 passes is provided on the inner face thereof with slide bearing 34 and sealing mechanism 35 for sealing rod 22 the slide contact portion between the rod and the through-hole. This sealing mechanism 35 has high pressure seal 36, low pressure seal 37 located nearer to the low pressure or atmospheric side of the cylinder than high pressure seal 36 is, and dust seal 38. Ring-shaped rebound stopper 39 made of an elastic material such as urethane elastomer is attached to the top of smaller-diameter portion 21a and it defines the terminal end of a stroke of rod 22 when rod 22 moves in direction A.

Metal bellows 45 is housed in larger-diameter portion 21b of cylinder 21. Bellows 45 has cylindrical bellows body 46 extensible in the axial direction of cylinder 21, and bellows cap 47 closing one end of bellows body 46. The other end 48 of bellows body 46 is fixed to shoulder 49 by a method capable of obtaining a secure sealing. Thus, bellows body 46 is located surrounding inner sleeve 23 and coaxial with cylinder 21. Bellows body 46 is formed of a stainless steel plate having a thickness of about 0.1 to 0.3 mm. It may be made of another metals and its thickness may be different from the above-mentioned range of values.

Ring-shaped valve 50 is arranged on the upper surface of bellows cap 47. Valve 50 is made of an elastic material such as urethane elastomer or silicon resin, and it is opposed to annular valve seat 51 formed around port 25 of inner sleeve 23. These valve 50 and valve seat 51 form self-sealing mechanism 52 for confining oil between inner sleeve 23 and bellows body 46 when bellows 45 contracts to an extent more than a predetermined value, as will be described later.

Ring-shaped bellows guide members 55 and 56 are fixed to the outer circumference of bellows body 46. They serve to maintain a certain clearance between bellows body 46 and cylinder 21 and to reduce slide resistance between them. A plurality of air passages are formed in each of the guide members, extending in the axial direction of cylinder 21.

The space in cylinder 21 is partitioned into liquid and gas chambers 60 and 80 by bellows 45. Liquid chamber 60 is defined on the side of sealing mechanism 35, that is, defined by inner faces of bellows 45 and smaller-diameter portion 21a of cylinder 21. Gas chamber 80 is defined by the outer face of bellows 45 and the inner face of larger-diameter portion 21b. Liquid chamber 60 is filled with oil. Cylinder 21 is provided with oil inlet hole 63, whose one end communicates with liquid chamber 60 and the other end is closed by ball 61 and screw 62.

Liquid chamber 60 comprises first liquid chamber 60a defined by the inside space of inner sleeve 23 and smaller-diameter portion 21a of cylinder 21, and second liquid chamber 60b defined by the outer face of inner sleeve 23 and the inner face of bellows 45. First liquid chamber 60a is further partitioned by piston 30 into first region 60c located on the side of through-hole 10 of cylinder 21 and second region 60d located on the side of inner sleeve 23. Second region 60d is communicates with second liquid chamber 60b through port 25 formed in end member 24 of inner sleeve 23.

As shown in FIGS. 2 and 3, push rod 22 is provided with system 70 for adjusting the damping force of the die cushion when push rod 22 moves up and down. System 70 includes valve chamber 68, first, second and third orifices 71, 72 and 73. First orifices 71 extend through piston 30 in the axial direction of piston 30 and connect first region 60c and second region 60d. Second orifices 72 extend in the radial direction of rod 22 and connect first region 60c to valve chamber 68. Third orifice 73 extends in the axial direction of rod 22 and connects second region 60d to valve chamber 68.

Third orifice 73 is opened and closed by one-way valve 75 of the poppet type arranged in valve chamber 68. Valve 75 is urged in a direction of closing third orifice 73 by compression spring 76 housed in valve chamber 68. One-way valve 75 is opened against spring 76 when pressure in second region 60d becomes higher than in first region 60c.

System 70 may be located in port 25 of end member 24 of inner sleeve 23, instead of its being arranged in rod 22. In other words, system 70 may be located at any of those portions through which oil or operation liquid in liquid chamber 60 flows when rod 22 moves relative to cylinder 21. System 70 may be designed to adjust the damping force of the die cushion at two or more steps or continuously when rod 22 moves in direction A. Moreover, system 70 may include plural plate valves such that the damping force of the die cushion caused when rod 22 moves in direction A is made larger than that of the die cushion caused when rod 22 moves in direction B. Further, in a case wherein system 70 is not required, system 70 other than orifices 71 may be omitted.

An inactive gas such as nitrogen, for example, is sealed in gas chamber 80. Pressure for charging the gas in gas chamber 80 is determined depending upon the wrinkle-preventing force which die cushion 20 is needed to create. The charging pressure is usually higher than several tens kg/cm$^2$. This gas pressure servers to contract bellows 45 or push the push rod in direction A. Gas supply port 82 in end wall 81 of cylinder 21 is closed by plug 83. Die cushion 20 has at a suitable position a safety valve (not shown) for discharging gas therethrough when pressure in gas chamber 80 rises higher than a certain value.

Figure 4:
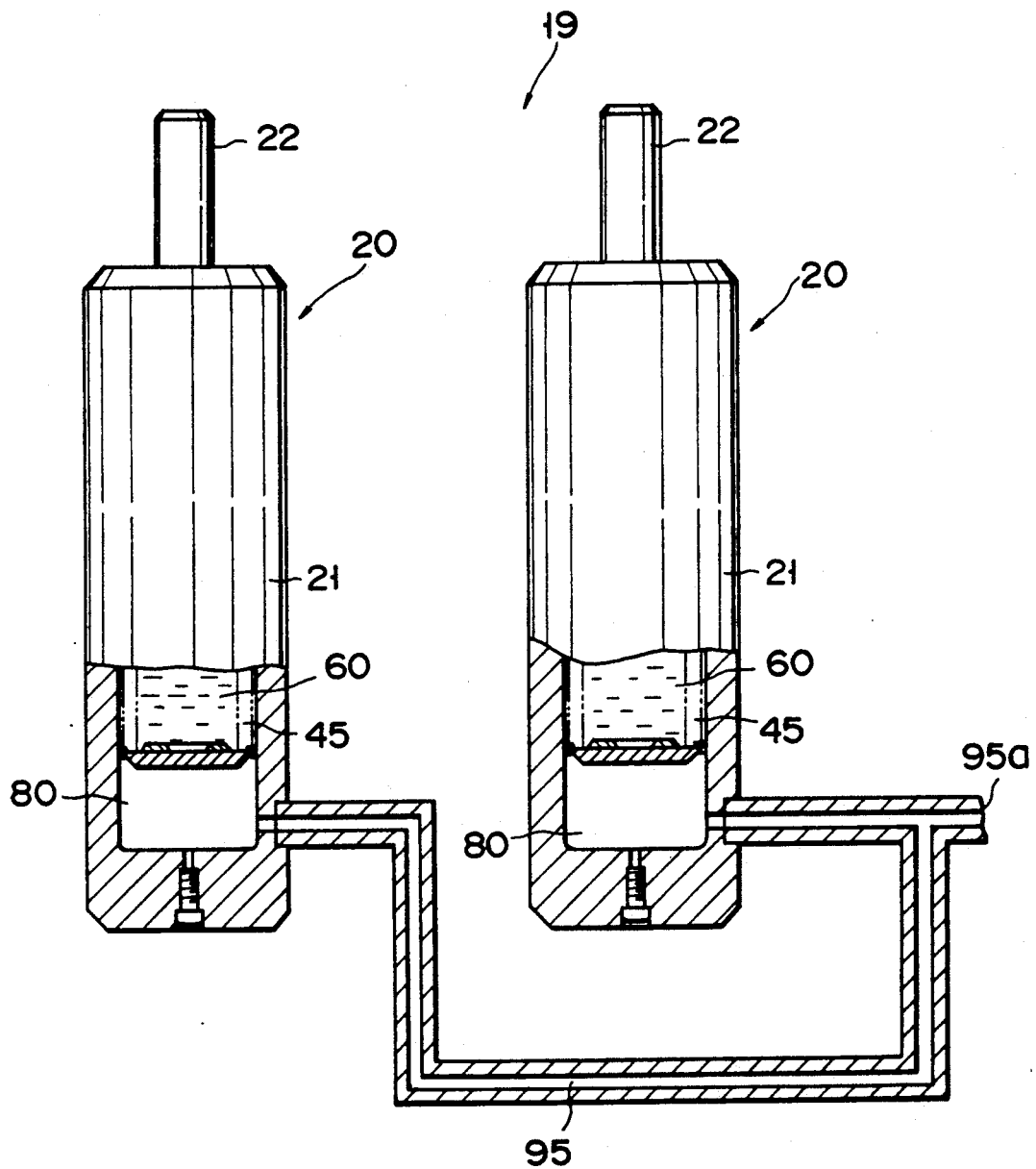
FIG. 4 is a sectional view of the die cushion which is being filled with gas.

As shown in FIG. 4, gas chambers 80 of a pair die cushions 20 each having the above-described arrangement communicate with each other through connecting pipe 95. End 95a of pipe 95 is closed. Another cylinder, accumulator or gas supply port may be connected to pipe 95, if necessary.

Gas is charged in gas chamber by the following processes.

Figure 5:
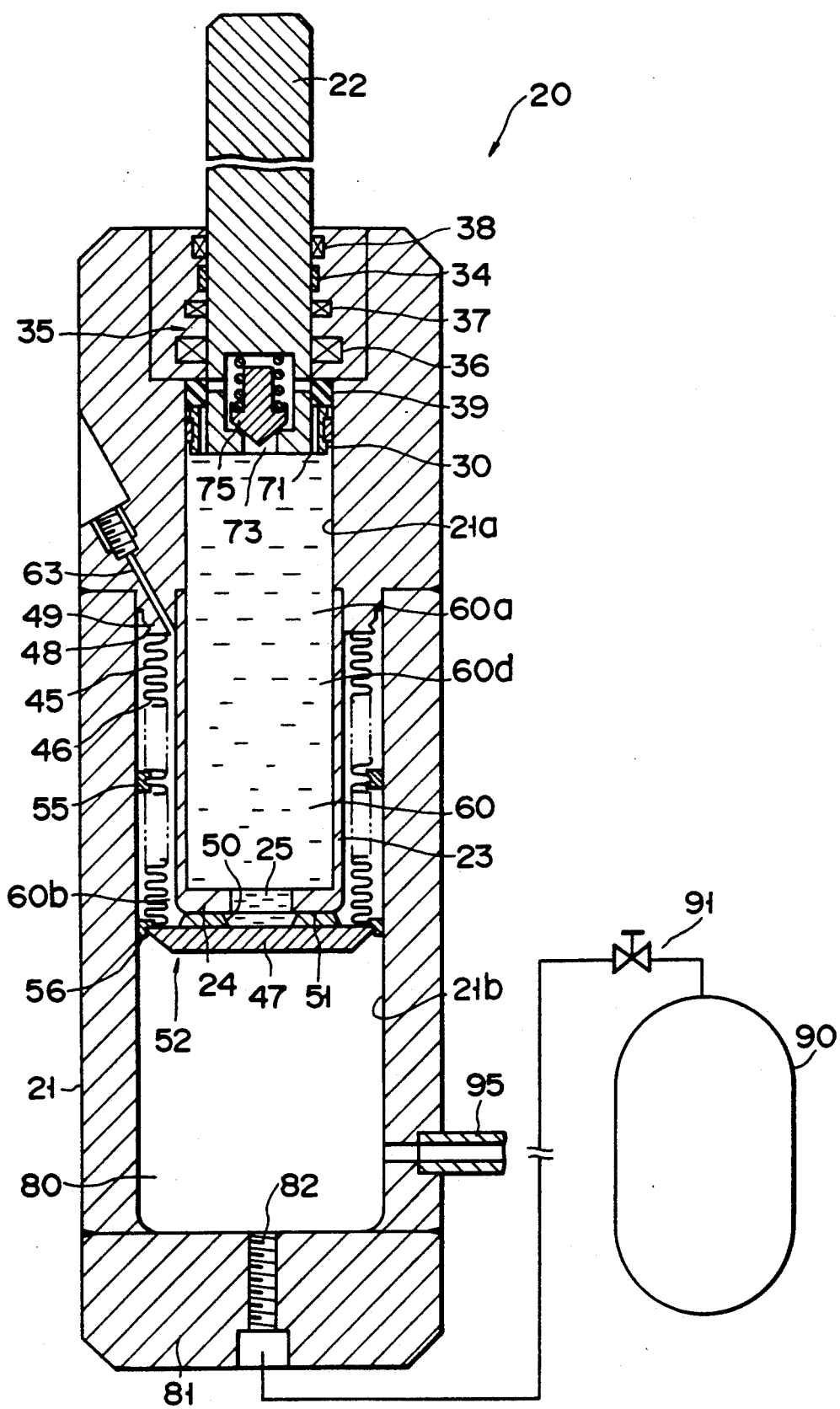
FIG. 5 is a front view showing the whole of the die cushion device partly cut away.

When gas is to be supplied to gas chamber 80, liquid chamber 60 is previously filled with oil. Opening 63 is opened. Pressurized-gas supply source 90 is then connected to gas supply port 82, as shown in FIG. 5. Valve 91 is interposed between supply source 90 and supply port 82. When valve 91 is opened, gas is supplied to gas chamber 80. As the amount of gas in gas chamber 80 increases, bellows body 46 contracts in the axial direction of cylinder 21. A part of oil in liquid chamber 60 is thus discharged outside through inlet hole 63.

Gas is charged in gas chamber 80 at two steps. More specifically, first, gas is charged in gas chamber 80 at a low pressure. When bellows body 46 contracts by a predetermined stroke, valve 50 of self-sealing mechanism 52 closely contacts with valve seat 51 to close port 25. Thus, bellows body 46 is prevented from further contracting in the axial direction of cylinder 21. Then, inlet hole 63 is closed by ball 61 and screw 62, thereby sealing second liquid chamber 60b in which oil is contained. Therefore, highly-pressurized gas is charged in gas chamber 80.

Gas is continuously in gas chamber 80 even after valve 50 closely contacts valve seat 51, so that gas pressure in gas chamber 80 gradually rises. Oil is substantially an incompressible fluid. Therefore, the inner face of bellows body 46 is uniformly supported all over it by oil in second liquid chamber 60b or oil confined in a space between the outer circumference of inner sleeve 23 and the inner face of bellows body 46. Accordingly, even when gas is continuously supplied to gas chamber 80 at high pressure, bellows body 46 cannot be excessively bent in the radial direction of cylinder 21. Thus, bellows body 46 maintains its cylindrical shape and a predetermined clearance is kept between bellows body 46 and the outer face of inner sleeve 23. When pressure in gas chamber 80 reaches a predetermined value, the supply of gas to gas chamber 80 is stopped and supply port 82 is closed by plug 83.

The die cushions each having its air chamber 80 filled with gas of predetermined pressure as described above are attached to slider 5 of the press machine and connected to push pressure pad 3. When punch 4 moves down together with slider 5 so as to press a blank, pressure pad 3 is brought into contact with the peripheral portion of blank 1 and rod 22 is forced into cylinder 21. Thus, bellows 45 expands in the axial direction of cylinder 21, and gas chamber 80 is compressed to increase pressure in gas chamber 80.

When rod 22 moves into cylinder 21, pressure in second region 60d becomes higher than that in first region 60c. As shown in FIG. 3, therefore, one-way valve 75 is opened and a part of oil in second region 60d flows into first region 60c, passing through second and third orifices 72 and 73. At the same time, a part of oil in second region 60d flows into first region 60c through first orifices 71. Most of oil in second region 60d also flows into second liquid chamber 60b through communication port 25. Thus, bellows body 46 expands to compress gas in gas chamber 80, thereby increasing the gas pressure. The gas pressure is applied, as wrinkle-preventing force, to push rod 22 through bellows 45 and the oil.

When rod 22 moves in direction B and one-way valve 75 is opened, plural oil passages for connecting first and second regions 60c and 60d with each other are formed by first, second and third orifices 71, 72 and 73. Therefore, oil in second region 60d can flow relatively easily into first region 60c, causing relatively small damping force to act on rod 22. Thus, rod 22 can be quickly drawn into cylinder 21, so that the die cushion quickly generates proper wrinkle-preventing force.

When slider 5 is lifted after the press process, rod 22 is pushed by gas pressure in gas chamber 80 in direction A of projecting from cylinder 21. At this time, pressure in first region 60c becomes higher than in second region 60d, causing one-way valve to be closed. Therefore, oil flows from first region 60c into second region 60d only through first orifices 71, and thus large damping force is applied to rod 22. The moving speed of rod 22 in direction A can be thus reduced, thereby preventing pressure pad 3 from being quickly lifted. As a result, the lifting speed of pressure pad 3 can be set lower than that of punch 4. The pressed piece can be thus prevented from lifting together with punch 4 and surely separated from punch 4. When rod 22 moves in projecting direction A, oil in second liquid chamber 60b flows into second region 60d, corresponding to the extent to which rod 22 moves up, and bellows 45 contracts to its original shape by means of gas pressure in gas chamber 80.

Gas in gas chamber 80 is completely separated from oil in liquid chamber 60 by metal bellows 45. Even when it is thin, metal bellows 45 can serve as an excellent gas barrier. It cannot happen therefore that gas in gas chamber 80 leaks into oil in liquid chamber 60. Further, gas chamber 80 has no slide contact portion which communicates with the atmosphere. Thus, even when rod 22 is reciprocated at high speed, therefore, gas in gas chamber 80 cannot directly leak into the atmosphere through the slide contact portion of rod 22. Sealing mechanism 35 for sealing the slide contact portion of rod 22 is located on the side of liquid chamber 60. Therefore, sealing mechanism 35 is only required to seal oil in cylinder 21. Oil having a viscosity higher than that of gas can be relatively easily and surely sealed in cylinder 21.

If oil is leaked from cylinder 21 through through-hole 10 by some unknown causes, the amount of oil in liquid chamber 60 is reduced while the volume of gas chamber 80 is increased accordingly. However, gas chambers 80 of two die cushions 20 communicate with each other through gas connecting pipe 95. Thus, even when oil leaks from one of die cushions 20 or the amount of oil leaked from one of die cushions 20 is different from that of oil leaked from the other, pressure in both of gas chambers 80 are kept a common value. This enables pressure pad 3 to be usually pushed by uniform surface pressure.

Die cushion 20 having the above-described arrangement is provided with self-sealing mechanism 52 for closing second liquid chamber 60b to confine oil inside the bellows body 46, when bellows 45 contracts to exceed its predetermined stroke. Therefore, even if oil is leaked from liquid chamber 60 by some unknown causes and the high pressure gas acts to contract bellows 45, oil is shut up in second liquid chamber 60b as bellows 45 contracts to such a position that valve 50 is closely seated on valve seat 51. Bellows body 46 can be uniformly supported from inside by oil thus confined. Thus, bellows body 46 is prevented from being excessively bent in the radial direction thereof, thereby effectively protect bellows 45.

Figure 6:
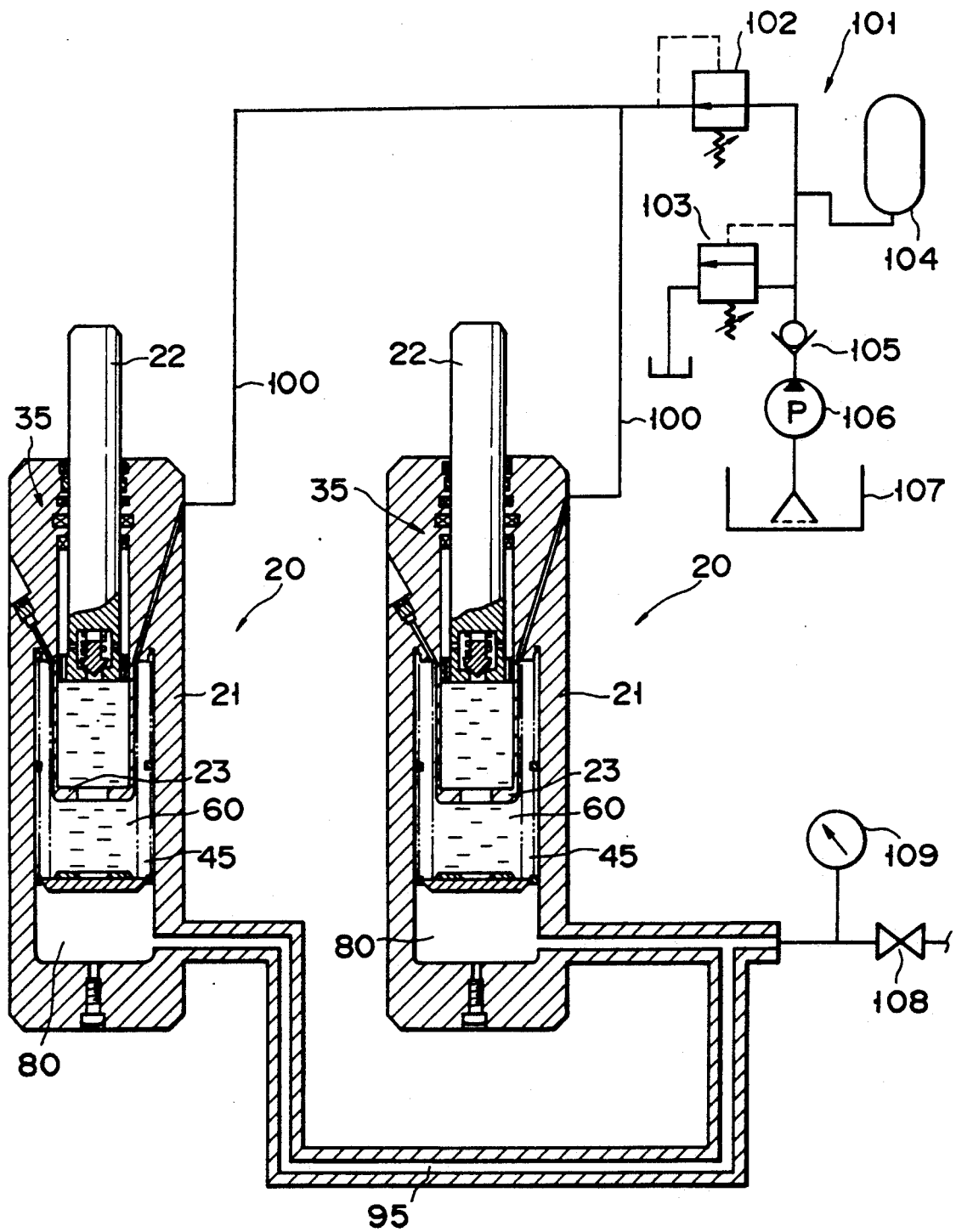
FIG. 6 is a sectional view of a die cushion device according to another embodiment of the present invention.

FIG. 6 shows a die cushion device according to another embodiment of the present invention. In this embodiment, a liquid supply means, e.g., hydraulic circuit 101 is connected to liquid chambers 60 of a pair of die cushions 20 through liquid passages 100. Hydraulic circuit 101 includes first pressure adjusting valve 102, second pressure adjusting valve 103, accumulator 104, check valve 105, oil supply pump 106, reservoir 107 and the like. Hydraulic pressure in the pipe extending from pump 106 to first pressure adjusting valve 102 is kept constant by second pressure adjusting valve 103. Gas connecting pipe 95 is provided with valve 108 and pressure gage 109. Another cylinder, accumulator and gas supply source may be connected to pipe 95.

According to this embodiment, pressure adjusting valve 102 actuates to feed oil from hydraulic circuit 101 to liquid chamber 60 so as to keep pressure in cylinder 21 certain, when oil in liquid chamber 60 leaks outside through through-hole 10 of cylinder 21 to lower the pressure in cylinder 21. When the pressure in cylinder 21 reaches the certain value, pressure adjusting valve 102 is closed. Therefore, even if oil leakage generates, spring constant and set load (or wrinkle-preventing force) of die cushions 20 can be always kept at a constant value. Further, even when the amount of oil leakage from die cushions 20 are different from each other, pressures in liquid chambers 60 can be quickly made equal to each other. This enables uniform surface pressure to act on a blank through the pressure pad. Pump 106 may be driven by an electric motor. However, since oil leaked through sealing means 35 is quite small, a manual pump of small capacity may used instead of pump 106.

Other components of the die cushion device are same as those of the first embodiment and the description thereof will be omitted accordingly.

It should be understood that the present invention is not limited to the above-described embodiments but that various changes and modifications can be made without departing from the scope and spirit of the present invention.

For example, the number of the die cushions used is not limited to two, and three or more die cushions may be used. The number of the die cushions used may be one. Further, the die cushion device according to the present invention can be applied to various press machines which include single and double action types, and the like.

What is claimed is:

1. A die cushion device for use with a press machine, comprising:
   a cylinder having one closed end and another end provided with a through-hole;
   a push rod inserted into the cylinder through the through-hole and freely movable in the axial direction of the cylinder;
   a bellows having a cylindrical metal bellows body coaxially housed in the cylinder and freely extensible in the axial direction of the cylinder, and said bellows having a plurality of ring-shaped guides fixed to an outer face of the bellows body and slidable on the inner face of the cylinder, said bellows partitioning the interior of the cylinder into a liquid chamber communicating with the through-hole and housing a part of the push rod therein, and a gas chamber located on the closed end side of the cylinder;
   means for sealing the cylinder between the push rod and the through-hole;
   operation liquid filled in the liquid chamber; and
   gas sealed in the gas chamber and pressurizing, through the bellows and operation liquid, the push rod in a direction of projecting from the cylinder.

2. A die cushion device according to claim 1, wherein said bellows body has one end which is fixed to the inner face of the cylinder and another end which is opened, said bellows further having an end member closing the opened end of the bellows body, and wherein said liquid chamber is defined on the inside of the bellows and said gas chamber is defined on the outside of the bellows.

3. A die cushion device according to claim 2, wherein said cylinder has an inner sleeve coaxially arranged in the bellows body, said inner sleeve having one end fixed to the inner face of the cylinder and the other end opposed to the end member of the bellows and provided with a communication port; and said liquid chamber is partitioned by the inner sleeve into a first liquid chamber which is defined on the inside of said inner sleeve and in which the push rod is located, and a second liquid chamber defined between the outer face of the inner sleeve and the inner face of the bellows and communicating with the first liquid chamber through the communication port.

4. A die cushion device according to claim 3, wherein said push rod has a piston slidable on the inner faces of the cylinder and inner sleeve, and said first liquid chamber is partitioned by the piston into a first region located on the through-hole side of the cylinder and a second region communicating with the second liquid chamber through the communication port.

5. A die cushion device according to claim 3, which further comprises means for adjusting damping force in such a way that the damping force of the operation liquid, which acts on the push rod when said push rod moves to come out of the cylinder, is made larger than that of liquid which acts on the push rod when said push rod moves to come into the cylinder.

6. A die cushion device according to claim 5, wherein said adjusting means includes first and second connecting means formed in the push rod to connect the first and second regions with each other, and valve means for closing the second connecting means when the push rod moves to come out of the cylinder and opening it when the push rod moves to come into the cylinder.

7. A die cushion device according to claim 6, wherein said first connecting means includes a plurality of first orifices formed in the piston, said second connecting means includes a valve chamber formed in the push rod, a plurality of second orifices connecting the valve chamber and the first region with each other, and a third orifice connecting the valve chamber and the second region with each other, and said valve means includes a valve body arranged in the valve chamber to open and close the third orifice.

8. A die cushion device according to claim 3, wherein said bellows further includes self-sealing means for preventing the bellows body from contracting over its predetermined stroke and closing the communication port of the inner sleeve to seal the second liquid chamber when the bellows body contracts by the predetermined stroke.

9. A die cushion device according to claim 8, wherein said self-sealing means includes a valve seat formed on the other end of the inner sleeve and located around the communication port to oppose the end member of the bellows, and a ring-shaped valve fixed to the end member of the bellows and adapted to contact with the valve seat when the bellows body contracts by the predetermined stroke.

10. A die cushion device according to claim 1, wherein said cylinder has an inner hole which includes a smaller-diameter portion located on the through-hole side of the cylinder, a larger-diameter portion located on the closed end side thereof, and a shoulder portion located between the smaller-and larger-diameter portions; said bellows body is located in the larger-diameter portion and has one end fixed to the shoulder portion and the other end opened; said bellows has an end member closing the opened end of the bellows body; and said liquid chamber is defined by the inner face of the bellows and the smaller-diameter portion of the cylinder while said gas chamber is defined by the outer face of the bellows and the inner face of the larger-diameter portion of the cylinder.

11. A die cushion device according to claim 10, wherein said cylinder has an inner sleeve coaxially located in the bellows body, said inner sleeve having one end fixed to the shoulder portion of the cylinder and the other end opposed to the end member of the bellows and closed by an end wall with a communication port; and said liquid chamber has a first liquid chamber defined by the inner face of the inner sleeve and the smaller-diameter portion of the cylinder and in which the push rod is located, and a second liquid chamber defined by the outer face of the inner sleeve and the inner face of the bellows and communicating with the first liquid chamber through the communication port.

12. A die cushion device according to claim 11, wherein said inner sleeve has an inner diameter same as that of the smaller-diameter portion of the cylinder and said push rod has a piston slidable on the inner faces of the smaller-portion and inner sleeve.

13. A die cushion device according to claim 1, which further comprises means for adjusting damping force of the operation liquid in such a way that the damping force, which acts on the push rod when the push rod moves to come out of the cylinder, is made larger than the damping force which acts on the rod when the push rod moves to come into the cylinder.

14. A die cushion device according to claim 13, wherein said push rod has a piston slidably arranged in the liquid chamber to partition the liquid chamber into a first region located on the through-hole side of the cylinder and a second region located on the side of the bellows, and said adjusting means has first and second connecting means formed in the push rod to connect the first and second regions with each other, and valve means for closing the second connecting means when the push rod moves to come out of the cylinder and opening it when the push rod moves to come into the cylinder.

15. A die cushion device according to claim 14, wherein said first connecting means has a plurality of first orifices formed in the piston, said second connecting means has a valve chamber formed in the push rod, a plurality of second orifices connecting the valve chamber and the first region with each other, and a third orifice connecting the valve chamber and the second region with each other, and said valve means has a valve housed in the valve chamber to open and close the third orifice.

16. A die cushion device according to claim 1, which further comprises self-sealing means for preventing said bellows body from contracting over its predetermined stroke and preventing the operation liquid from flowing in the liquid chamber when the bellows body contracts the predetermined stroke.

17. A die cushion device according to claim 16, wherein said self-sealing means includes a partitioning member located in the bellows to partition the liquid chamber into a first liquid chamber which is located on the through-hole side of the cylinder and in which the push rod is located, and a second liquid chamber located on the side of the bellows body; a communication port formed in the partition member to connect the first and second liquid chambers with each other, a valve seat formed on the partition member and arranged around the communication port, and a ring-shaped valve fixed to the bellows in opposite to the valve seat and adapted to contact with the valve seat when the bellows body contracts by the predetermined stroke.

18. A die cushion device for use with a press machine having a pressure member for holding a work, and for applying pressure to said pressure member, said die cushion device comprising:
  a plurality of die cushions, each including:
    a cylinder having one closed end and another end provided with a through-hole;
    a push rod connected to the pressure member, inserted into the cylinder through the through-hole and freely movable in the axial direction of the cylinder;
    a bellows having a metal bellows body housed in the cylinder and freely extensible in the axial direction of the cylinder, said bellows partitioning the interior of the cylinder into a liquid chamber communicating with the through-hole and housing a part of the push rod therein, and a gas chamber located on the closed end side of the cylinder;

means for sealing the cylinder between the push rod and the through-hole;

operation liquid filled in the liquid chamber; and gas sealed in the gas chamber and pressurizing, through the bellows and operation liquid, the push rod in a direction of projecting from the cylinder; and means for connecting the gas chambers in the die cushions with one another to maintain uniform the gas pressure in the gas chambers so that the pressure member is uniformly applied with pressure by means of the die cushions.

19. A die cushion device according to claim 18, wherein said bellows body is shaped like a cylinder and extends coaxially with said cylinder and push rod, said bellows having a plurality of ring-shaped guides fixed to an outer face of the bellows body and slidable on the inner face of the cylinder.

20. A die cushion device according to claim 18, which further comprises means connected to the liquid chambers in the die cushions, for supplying operation liquid to the liquid chambers when pressures in the liquid chambers become smaller than a predetermined value.

21. A die cushion device according to claim 18, wherein said push rods of said die cushions are coupled to said pressure member to apply pressure thereto.

22. A die cushion device for use with a press machine, comprising:

a plurality of die cushions, each including:

a cylinder having one closed end and another end provided with a through-hole;

a push rod inserted into the cylinder through the through-hole and freely movable in the axial direction of the cylinder;

a bellows having a cylindrical metal bellows body coaxially housed in the cylinder and freely extensible in the axial direction of the cylinder, and said bellows having a plurality of ring-shaped guides fixed to an outer face of the bellows body and slidable on the inner face of the cylinder, said bellows partitioning the interior of the cylinder into a liquid chamber communicating with the through-hole and housing a part of the push rod therein, and a gas chamber located on the closed end side of the cylinder;

means for sealing the cylinder between the push rod and the through-hole;

operation liquid filled in the liquid chamber; and gas sealed in the gas chamber and pressurizing, through the bellows and operation liquid, the push rod in a direction of projecting from the cylinder; and means for connecting the gas chambers in the die cushions with one another to maintain uniform the gas pressure in the gas chambers.

23. A die cushion device according to claim 22, wherein said push rods of said die cushions are coupled to said press machine to apply a pressure to at least a part of said press machine.

* * * * *